J. M. & J. H. DECKER.
LATCH.
APPLICATION FILED AUG. 10, 1917.
1,274,693.
Patented Aug. 6, 1918.
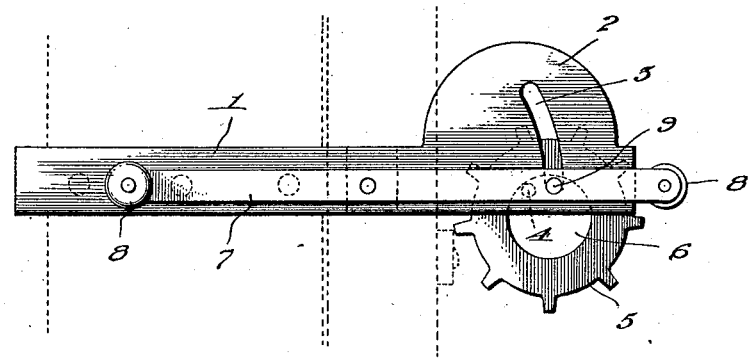
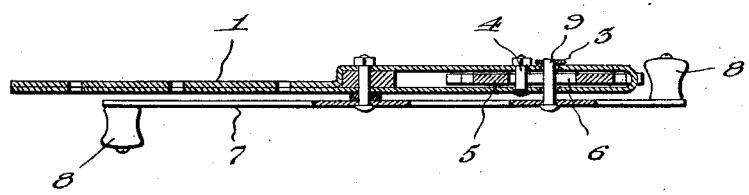
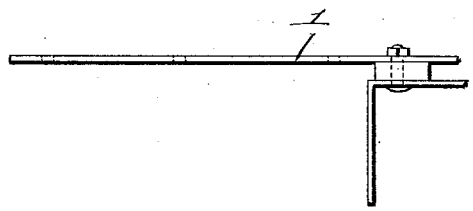
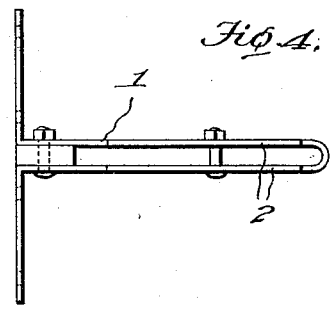
WITNESSES
INVENTORS
J. M. Decker
J. H. Decker
BY Victor J. Evans
ATTORNEY

UNITED STATES PATENT OFFICE.

JAMES M. DECKER AND JAMES H. DECKER, OF DOUGLAS, ARIZONA.

LATCH.

1,274,693.

Specification of Letters Patent.

Patented Aug. 6, 1918.

Application filed August 10, 1917. Serial No. 185,515.

*To all whom it may concern:*

Be it known that we, JAMES M. DECKER and JAMES H. DECKER, citizens of the United States, residing at Douglas, in the county of Cochise and State of Arizona, have invented new and useful Improvements in Latches, of which the following is a specification.

This invention relates to latches adapted to be used for securing doors, gates and the like and it consists in the novel features hereinafter described and claimed.

An object of the invention is to provide a latch of simple and durable structure which is automatic in its action for securing a door or gate in a closed position and which may be readily operated manually for releasing the door or gate whereby the same may be moved from a closed to an open position.

With this object in view the latch structure includes a frame adapted to be applied to a post or stile of a door or gate and in which a sprocket wheel is loosely mounted for turning and vertical movement. The said sprocket wheel is provided at its center with an enlarged opening which receives a stud carried by the frame and a lever is pivoted upon the frame and is provided with a stud which passes through the opening at the center of the said sprocket wheel. The last mentioned stud is arranged to move along arcuate slots provided in the frame and hence means are provided for lifting the said sprocket wheel.

In operation an arm which is carried by the gate or door engages the said sprocket wheel as the said gate or door moves to a closed position and the said sprocket wheel is lifted and partially rotated whereby the said arm passes behind the same. The arm is prevented from disengaging the said sprocket wheel in consequence of a tendency on the part of the door or gate to swing in an outward direction by reason of the fact that one of the teeth of the wheel engages the frame whereby the wheel is held against turning movement and also prevented from moving in an upward direction. When it is desired to disengage the arm from the wheel the lever is swung whereby the wheel is lifted and then the arm may be readily passed away from the frame of the latch structure and below the said sprocket wheel.

In the accompanying drawing:—

Figure 1 is a side elevation of the latch.

Fig. 2 is a horizontal sectional view of the same.

Fig. 3 is an edge view of a modified form of frame which may be used in the device.

Fig. 4 is a similar view of still another modification of the frame.

The latch structure comprises a frame 1 which may be of any suitable or conventional form whereby it may be easily and quickly applied to a post or the stile of a gate or door frame. The said frame 1 comprises a single strip of metal which is bent upon itself at a point between its ends and which is provided with spaced side portions. The said side portions are provided with upwardly disposed portions 2 which in turn are provided with arcuate slots 3. A stud 4 is connected at its end portions with the side portions of the frame 1 and bridges the space between the side portion of the said frame.

The latch structure also includes a sprocket wheel 5 which is provided at its center with an enlarged opening 6 through which the stud 4 passes. The sprocket wheel 5 lies between the side portions of the frame 1 and between the portion 2 of the said frame. A lever 7 is fulcrumed upon the frame 1 and is provided at its ends and at opposite sides with knobs 8. The lever 7 is further provided with a stud 9 which passes through the slot 3 and the opening 6 of the sprocket wheel 5. The stud 4 is located at a point between the stud 9 and at a point where the lever 7 is fulcrumed upon the frame 1.

The lower portion of the sprocket wheel 5 normally projects below the lower end of the frame 1 and the gate or door is provided with an arm which is adapted to encounter the lower portion of the sprocket wheel when the said gate or door moves to a closed position. The said arm lifts the sprocket wheel 5 and partially turns or rotates the same whereby the said arm moves behind the inner edge of the said sprocket wheel. In the event that the said arm should attempt to move in an opposite direction it will encounter the sprocket wheel and one of the teeth thereof will be forced into engagement with the frame 1 at the bend thereof and thus the outward movement of the arm is checked or interrupted and the door or gate is securely held in a closed position. When it is desired to open the door or gate an operator swings the lever 7 by using either of the knobs 8 and thus the stud 9 is moved along the slot 3 and when it engages the upper edge of the opening 6 of the sprocket wheel 5 the said sprocket wheel is lifted whereby the lower portion of the sprocket wheel is elevated above the path of movement of the arm which is attached to the door or gate and consequently the door or gate may be readily swung from a closed to an open position.

Having described the invention what is claimed is:—

1. A latch comprising a frame, a stud carried by the frame, a sprocket wheel having an enlarged opening which receives the stud and so arranged that one of its teeth is normally held in engagement with the frame and a lever mounted upon the frame and adapted to elevate the sprocket wheel.

2. A latch comprising a frame provided with arcuate slots, a stud carried by the frame, a sprocket wheel having an enlarged opening which receives the stud and so arranged that one of its teeth is normally held in engagement with the frame, a lever fulcrumed upon the frame and a stud carried by the said lever and passing through the said slot and the opening of the sprocket wheel.

In testimony whereof we affix our signatures.

JAMES M. DECKER.
JAMES H. DECKER.

Copies of this patent may be obtained for five cents each, by addressing the "Commissioner of Patents, Washington, D. C."